United States Patent [19]

Kuo

[11] Patent Number: 5,877,880
[45] Date of Patent: Mar. 2, 1999

[54] INFRARED-TRANSMISSION APPARATUS HAVING A TRANSMISSION ANGLE OR DIRECTION ADJUSTMENT DEVICE

[75] Inventor: Shih-jen Kuo, Taipei, Taiwan

[73] Assignee: Behavior Tech Computer Corporation, Taipei, Taiwan

[21] Appl. No.: 733,153

[22] Filed: Oct. 16, 1996

[51] Int. Cl.⁶ .................................................. H04B 10/24

[52] U.S. Cl. ............................................................ 359/159

[58] Field of Search .................................. 364/525, 709; 345/168; 455/601; 359/131, 109, 154, 172; 702/135

[56] References Cited

U.S. PATENT DOCUMENTS

| | | | |
|---|---|---|---|
| 4,727,600 | 2/1988 | Avakian | 455/601 |
| 4,977,618 | 12/1990 | Allen | 455/607 |
| 5,416,627 | 5/1995 | Wilmoth | 359/159 |
| 5,475,381 | 12/1995 | Williamson et al. | 340/825.57 |
| 5,566,022 | 10/1996 | Segev | 359/172 |

OTHER PUBLICATIONS

Optoelectronics, Chapter 4, Manipulating and Controlling Light, pp. 101–115, by Forrest M. Mims III, 1975.
Electro–optics, Chapter 3, p. 50, by Lewis J. Pinson, 1985.
F. Gfeller, et al., Minicomputer System Components Interconnected Via a Serial Infrared Link, IBM Technical Disclosure Bulletin, vol. 25, No. 8, pp. 4135–4137, Jan. 1, 1983.
Rosenberg, IBM Readies *Peanut* for Nov. 1 Debut, Boston Globe, Oct. 14, 1983.
IBM's Peanut Marketing Plan Reveals Careful Avoidance of Conflict With PC, Oct. 31, 1983.

Primary Examiner—James P. Trammell
Assistant Examiner—Matthew Smithers
Attorney, Agent, or Firm—Bacon & Thomas, PLLC

[57] ABSTRACT

A transmission angle adjusting device includes a first transmission device and a second transmission device disposed on the computer and the keyboard respectively. Each of the first and the second transmission devices has an infrared transmitter, an infrared receiver and a transmission angle/direction adjusting device arranged between the transmitter and the computer (or the keyboard) or disposed between the receiver and the keyboard (or the computer). Since the transmission angle/direction adjusting device can adjust the transmission angle of the infrared transmitter, transmission signals from adjacently arranged transmission devices can be separated from each other in order to prevent interference.

9 Claims, 3 Drawing Sheets

INFRARED-TRANSMISSION APPARATUS HAVING A TRANSMISSION ANGLE OR DIRECTION ADJUSTMENT DEVICE

BACKGROUND OF THE INVENTION

The present invention relates to an infrared-transmission apparatus, and particular to an infrared-transmission apparatus for communicating between a computer and a keyboard.

A keyboard is an essential item of equipment for a computer application. However, conventional keyboards are always connected to the computer via a cable, and this will inevitably create inconvenience during operation.

Wireless keyboards have also been developed and divided into two categories, that is, radio frequency transmission and infrared transmission. The radio-frequency-transmission keyboards have a higher precision but a complicated structure is required. This will induce a higher cost in manufacturing and difficulty in assembling. There is also interference between the keyboards when several keyboards and computers are closely disposed together, such as in an office. The infrared-transmitted keyboards have the advantages of simple structure and low cost. However, the interference between the keyboards still can not be prevented.

SUMMARY OF THE INVENTION

An objective of the present invention is to provide an infrared-transmission apparatus having a transmission angle adjusting device.

Another objective of the present invention is to provide an infrared-transmission apparatus having a transmission direction adjusting structure.

According to one aspect of the present invention, there is provided an infrared-transmission apparatus comprising a first transmission device which is disposed on a keyboard and includes an infrared transmitter and an infrared receiver, a second transmission device which has similar structure as the first transmission device and which is disposed on a computer, the first transmission device and the second transmission device receiving a signal from each other, and a transmission angle adjusting device disposed at the base of the first and/or the second transmission device for adjusting the transmission and /or receiving angle.

Other objects, advantages, and novel features of the invention will become more apparent from the following detailed description when taken in conjunction with the accompanying drawings.

DETAILED DESCRIPTION OF THE PREFERRED EMBODIMENTS

Figure 3:
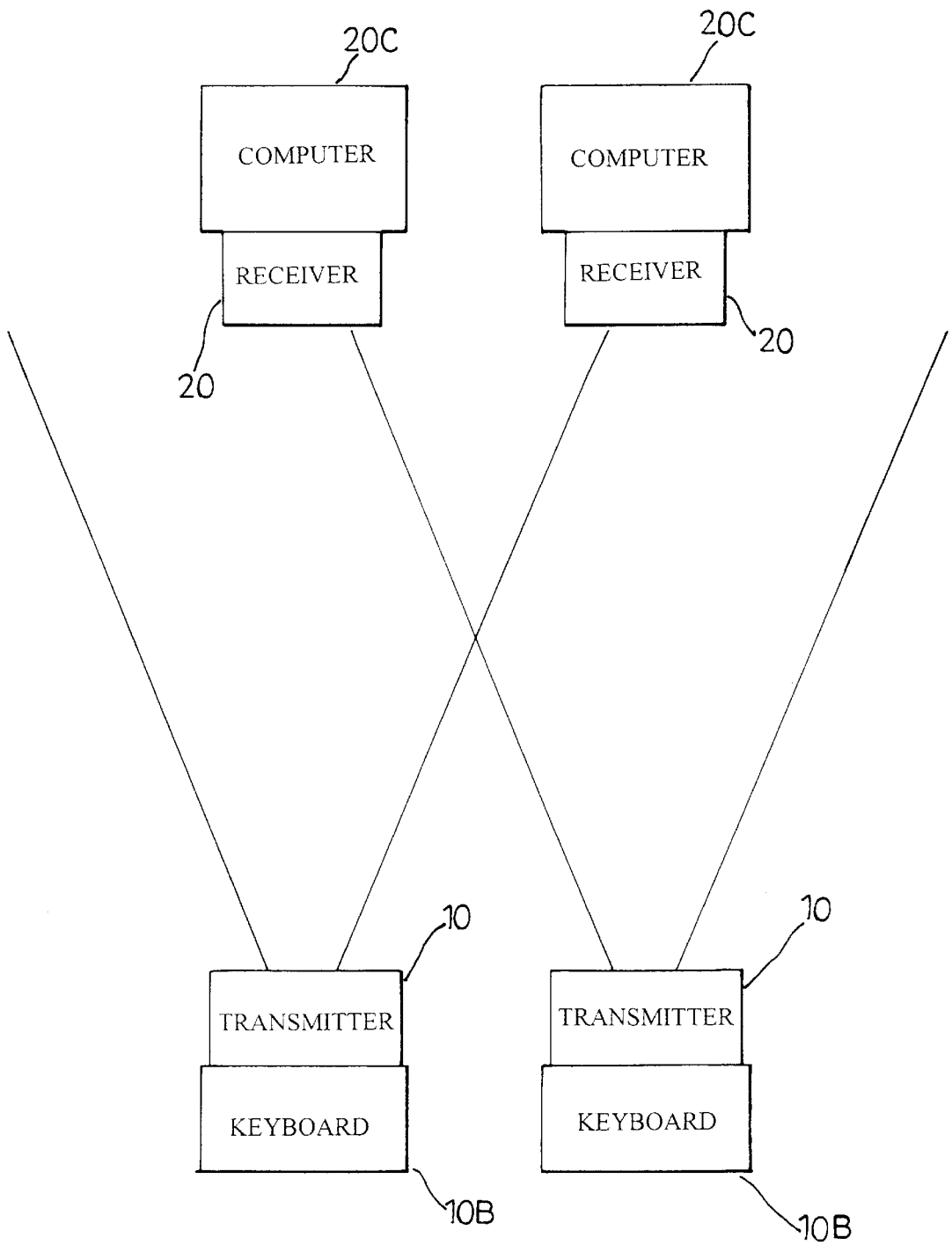
FIG. 3 is a schematic view of two conventional keyboards each of which has an infrared transmitter wherein the two infrared transmitters interfere with each other.

FIG. 3 illustrates two-infrared transmitters 10 disposed on two keyboards 10B respectively. Two conventional infrared receivers 20 are disposed on two computers 20C respectively. Each infrared receiver 20 receives a signal from respective infrared transmitter 10. As shown in FIG. 3, when the two pairs of transmitters 10 and receivers 20 are closely arranged, the transmitters 10 and the receivers 20 are apt to interfere with each other.

Figure 1:
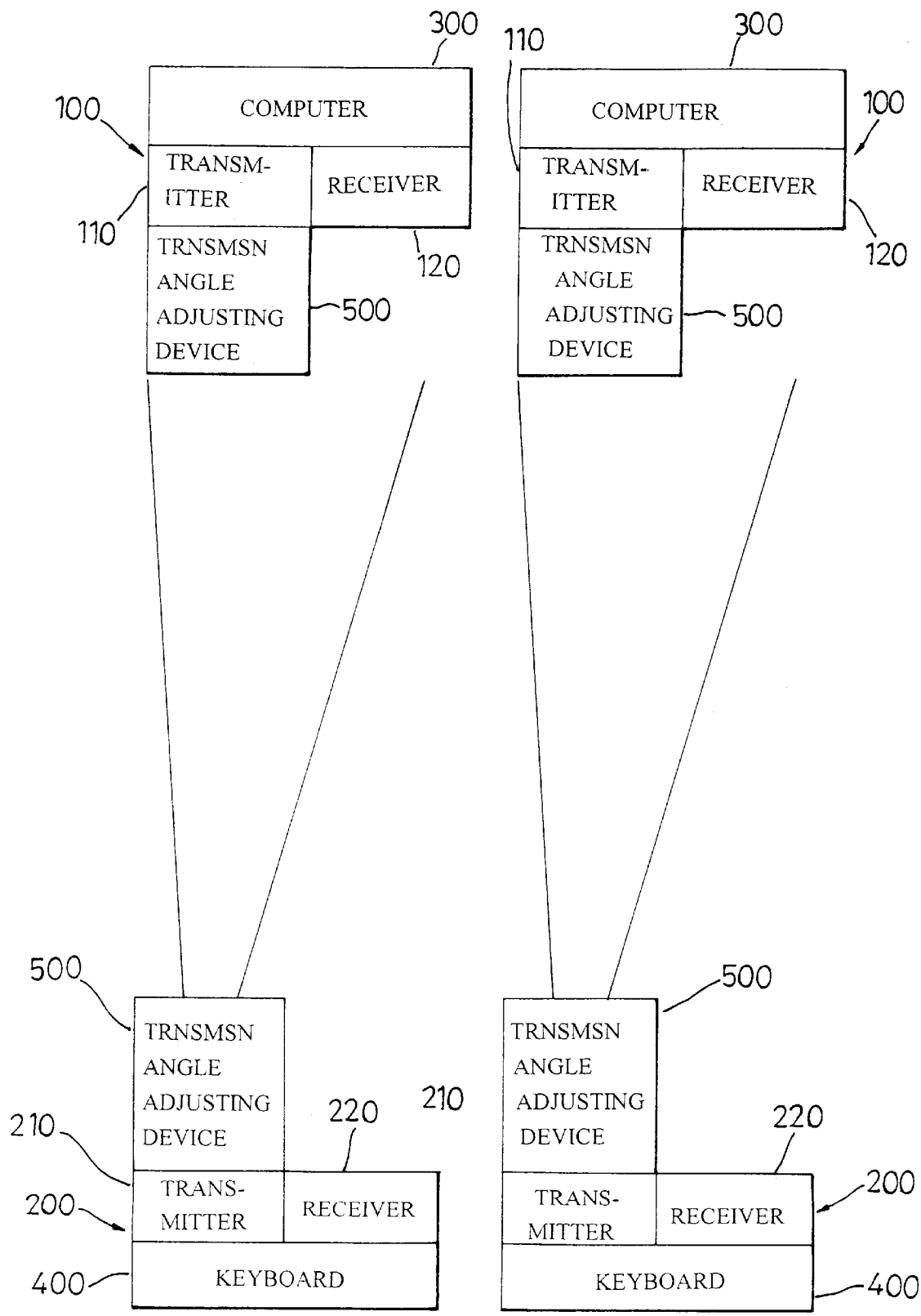
FIG. 1 is a schematic view of two keyboards each of which has an infrared-transmission apparatus with a transmission angle adjusting device in accordance with the present invention.

Referring to FIG. 1, a transmission angle adjusting device in accordance with the present invention comprises a first transmission device 100 and a second transmission device 200 respectively disposed on a computer 300 and a keyboard 400. Each of the first and the second transmission devices 100 and 200 respectively has an infrared transmitter 110 and 210, an infrared receiver 120, 220, and a transmission angle adjusting device 500 respectively arranged on the transmitters 110 and 210. The transmission angle adjusting devices 500 can adjust the transmission angle of the infrared transmitters 110 and 210 and, therefore, transmitting signals from two adjacent pairs of transmitters 110 and 210 can be separated from each other in order to prevent interference therebetween.

Figure 2:
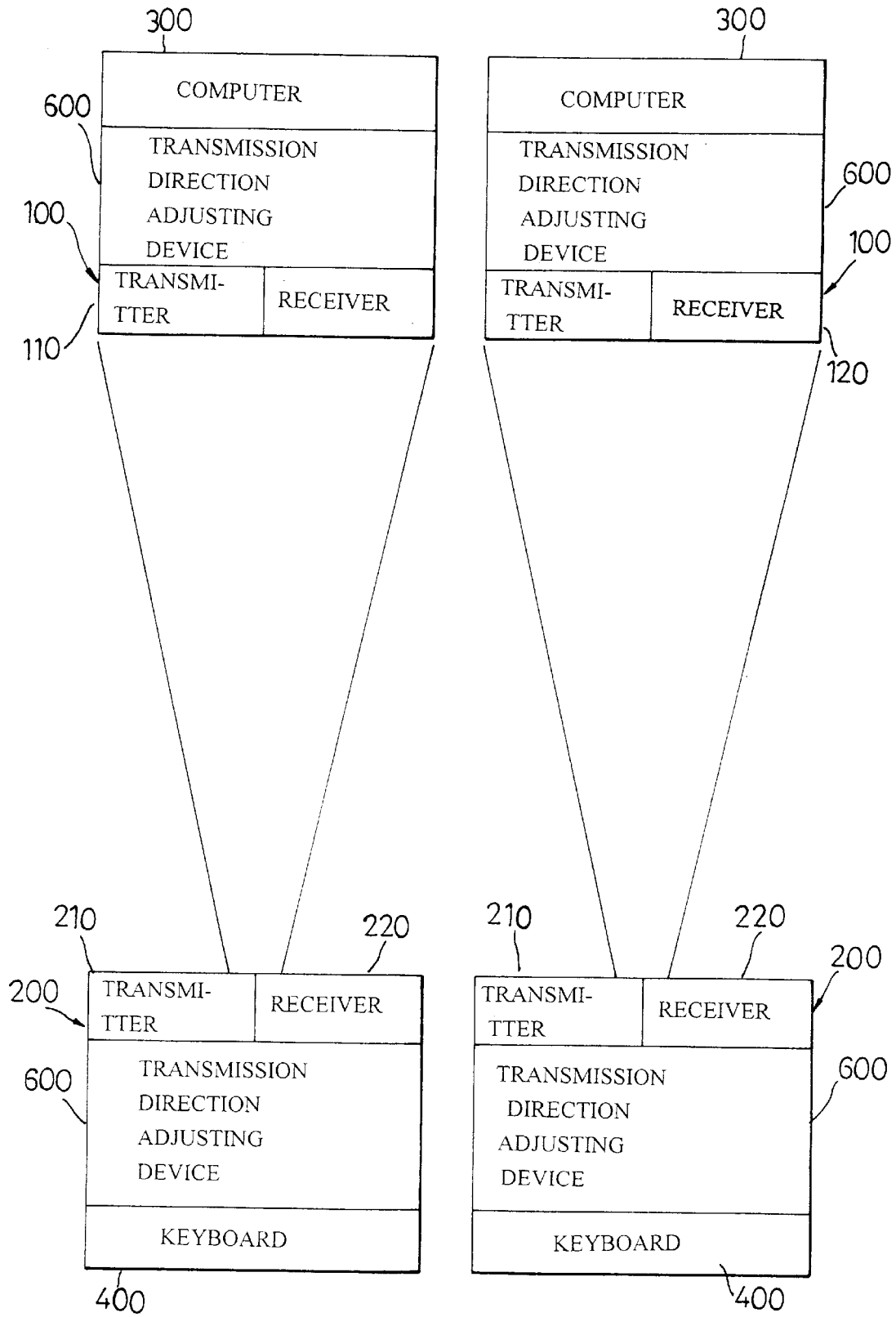
FIG. 2 is a schematic view of two keyboards each of which has an infrared-transmission apparatus with a transmission direction adjusting device of the present invention.

Referring to FIG. 2, a transmission direction adjusting device in accordance with the present invention comprises a first transmission device 100 and a second transmission device 200 respectively disposed on a computer 300 and a keyboard 400. Each of the first and the second transmission devices 100 and 200 respectively has an infrared transmitter 110 and 210, an infrared receiver 120, 220, and a transmission direction adjusting device 600 respectively arranged between the first and/or second transmission devices 100 and 200, and the computer 300 and/or the keyboard 400. The transmission direction adjusting devices 600 can adjust transmission direction of the infrared transmitters 110 and 210 and, therefore, transmitting signals from two adjacent pairs of transmitters 110 and 210 can be separated from each other in order to prevent interference therebetween.

The following are several embodiments of the transmission angle adjusting device according to the present invention:

a) a mask disposed in front of the transmitter to eliminate light scattering;

b) an extendible sleeve disposed in front of the transmitter to narrow or broaden the transmission angle; and c) concave and/or convex lenses used for varying the focus of the infrared ray transmitted from the transmitter.

The following are several embodiments of the transmission direction adjusting device according to the present invention::

a) a spherical or semi-spherical body provided and disposed between the transmission device and the computer and/or the keyboard;

b) a flexible pipe, such as plastic pipe, connected between the transmission device and the computer and/or the keyboard for adjusting the transmission direction;

c) a multiple joint used for adjusting the transmission direction; and d) convex/concave lenses used for adjusting the transmission direction.

By means of the embodiments of the present invention, the transmission angle and direction of the infrared transmitter can be suitably adjusted in order to meet the requirements of the actual situation of the applied location.

Although the invention has been explained in relation to its preferred embodiment, it is to be understood that many other possible modifications and variations can be made without departing from the spirit and scope of the invention as hereinafter claimed.

I claim:

1. An infrared transmission apparatus comprising:
   a first transmission device having an infrared transmitter and an infrared receiver disposed on a computer;
   a second transmission device having an infrared transmitter and an infrared receiver disposed on a keyboard; and
   a transmission angle of divergence adjusting device arranged on one of the first transmission device and the second transmission device in order to adjust the transmission angle of divergence of the transmission device, wherein said transmission angle of divergence adjusting device is a mask.

2. An infrared transmission apparatus comprising:
   a first transmission device having an infrared transmitter and an infrared receiver disposed on a computer;
   a second transmission device having an infrared transmitter and an infrared receiver disposed on a keyboard; and
   a transmission angle of divergence adjusting device arranged on one of the first transmission device and the second transmission device in order to adjust the transmission angle of divergence of the transmission device, wherein said transmission angle of divergence adjusting device is a sleeve.

3. An infrared transmission apparatus comprising:
   a first transmission device having an infrared transmitter and an infrared receiver disposed on a computer;
   a second transmission device having an infrared transmitter and an infrared receiver disposed on a keyboard; and
   a transmission angle of divergence adjusting device arranged on one of the first transmission device and the second transmission device in order to adjust the transmission angle of divergence of the transmission device, wherein said transmission angle of divergence adjusting device is a concave lens.

4. An infrared transmission apparatus comprising:
   a first transmission device having an infrared transmitter and an infrared receiver disposed on a computer;
   a second transmission device having an infrared transmitter and an infrared receiver disposed on a keyboard; and
   a transmission angle of divergence adjusting device arranged on one of the first transmission device and the second transmission device in order to adjust the transmission angle of divergence of the transmission device, wherein said transmission angle of divergence adjusting device is a convex lens.

5. An infrared transmission apparatus comprising:
   a first transmission device having an infrared transmitter and an infrared receiver disposed on a computer;
   a second transmission device having an infrared transmitter and an infrared receiver disposed on a keyboard; and
   a transmission angle of divergence adjusting device arranged on one of the first transmission device and the second transmission device in order to adjust the transmission angle of divergence of the transmission device, wherein said transmission angle of divergence adjusting device is a spherical body.

6. An infrared transmission apparatus comprising:
   a first transmission device having an infrared transmitter and an infrared receiver disposed on a computer;
   a second transmission device having an infrared transmitter and an infrared receiver disposed on a keyboard; and
   a transmission direction adjusting device arranged on the first and/or second transmission device in order to adjust the transmission angle of the transmission device, wherein said transmission direction adjusting device is a semi-spherical body.

7. An infrared transmission apparatus comprising:
   a first transmission device having an infrared transmitter and an infrared receiver disposed on a computer;
   a second transmission device having an infrared transmitter and an infrared receiver disposed on a keyboard; and
   a transmission direction adjusting device arranged on the first and/or second transmission device in order to adjust the transmission angle of the transmission device, wherein said transmission direction adjusting device is a convex lens.

8. An infrared transmission apparatus comprising:
   a first transmission device having an infrared transmitter and an infrared receiver disposed on a computer;
   a second transmission device having an infrared transmitter and an infrared receiver disposed on a keyboard; and
   a transmission direction adjusting device arranged on the first and/or second transmission device in order to adjust the transmission angle of the transmission device, wherein said transmission direction adjusting device is a concave lens.

9. An infrared transmission apparatus comprising:
   a first transmission device having an infrared transmitter and an infrared receiver disposed on a computer;
   a second transmission device having an infrared transmitter and an infrared receiver disposed on a keyboard; and
   a transmission direction adjusting device arranged on the first and/or second transmission device in order to adjust the transmission angle of the transmission device, wherein said transmission direction adjusting device is a multiple joint.

* * * * *